(12) United States Patent
Yachi (10) Patent No.: US 10,264,223 B2
(45) Date of Patent: Apr. 16, 2019

(54) IMAGE PROCESSING DEVICE AND IMAGE PROCESSING METHOD

(71) Applicant: OLYMPUS CORPORATION, Hachioji-shi, Tokyo (JP)

(72) Inventor: Akikazu Yachi, Saitama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/824,109

(22) Filed: Nov. 28, 2017

(65) Prior Publication Data

US 2018/0084230 A1 Mar. 22, 2018

Related U.S. Application Data

(63) Continuation of application No. PCT/JP2015/075283, filed on Sep. 7, 2015.

(51) Int. Cl.
*H04N 5/235* (2006.01)
*H04N 9/04* (2006.01)
(Continued)

(52) U.S. Cl.
CPC ............... *H04N 9/04* (2013.01); *G06K 9/40* (2013.01); *G06T 5/002* (2013.01); *H04N 5/217* (2013.01);
(Continued)

(58) Field of Classification Search
CPC ...... H04N 9/04; H04N 9/045; H04N 5/23232; H04N 5/217; H04N 5/235; H04N 9/77; H04N 9/64; G06T 5/002; G06K 9/40
See application file for complete search history.

(56) References Cited

U.S. PATENT DOCUMENTS 6,714,242 B1 * 3/2004 Kobayashi ............ G06T 3/4007
348/272
8,817,137 B2 * 8/2014 Utsugi .................... H04N 9/07
348/222.1
(Continued)

FOREIGN PATENT DOCUMENTS

JP 10013734 A 1/1998
JP 2004096284 A 3/2004
(Continued)

OTHER PUBLICATIONS

International Search Report (ISR) and Written Opinion dated Nov. 24, 2015 issued in International Application No. PCT/JP2015/075283.

Primary Examiner — Padma Haliyur
(74) Attorney, Agent, or Firm — Holtz, Holtz & Volek PC (57) ABSTRACT

An image processing device according to the present invention includes: a color space conversion unit that calculates brightness signals and color difference signals from RGB signals of two images of a single subject acquired under different image acquisition conditions; a color difference determination unit that determines whether or not the absolute value of the difference between the color difference signals of the two images calculated by the color space conversion unit is smaller than a predetermined threshold value; and a color averaging unit that, if the color difference determination unit determines that the absolute value of the difference between the color difference signals of the two images is smaller than the threshold value, averages the color difference signals of the two images and calculates average color difference signals.

10 Claims, 9 Drawing Sheets

(51) Int. Cl.
*H04N 9/64* (2006.01)
*G06K 9/40* (2006.01)
*G06T 5/00* (2006.01)
*H04N 9/77* (2006.01)
*H04N 5/217* (2011.01)
*H04N 5/232* (2006.01)

(52) U.S. Cl.
CPC ......... *H04N 5/235* (2013.01); *H04N 5/23232* (2013.01); *H04N 9/045* (2013.01); *H04N 9/64* (2013.01); *H04N 9/77* (2013.01)

(56) References Cited

U.S. PATENT DOCUMENTS

| | | | |
|---|---|---|---|
| 9,225,948 B2 * | 12/2015 | Hasegawa | G06T 3/4007 |
| 2008/0259187 A1 | 10/2008 | Izawa | |
| 2016/0163066 A1 * | 6/2016 | Ishihara | G06K 9/00234 |
| | | | 382/162 |

FOREIGN PATENT DOCUMENTS

| | | | |
|---|---|---|---|
| JP | 2008131580 A | 6/2008 |
| JP | 2008271024 A | 11/2008 |
| JP | 2010010976 A | 1/2010 |
| JP | 2011071925 A | 4/2011 |
| JP | 2012073813 A | 4/2012 |

* cited by examiner

IMAGE PROCESSING DEVICE AND IMAGE PROCESSING METHOD

CROSS-REFERENCE TO RELATED APPLICATIONS

This is a continuation of International Application PCT/JP2015/075283 which is hereby incorporated by reference herein in its entirety.

TECHNICAL FIELD

The present invention relates to an image processing device and an image processing method.

BACKGROUND ART

There is a known noise reduction method using a plurality of images (refer to, for example, Patent Literature 1).

This noise reduction method is a method in which the motion of a subject is estimated between images acquired at different times, a signal correlation (field correlation) is calculated on the basis of motion-corrected images, and a color difference signal is smoothed in the time-series direction if the value of the correlation is high.

CITATION LIST

Patent Literature

{PTL 1}
Japanese Unexamined Patent Application, Publication No. 10-13734

SUMMARY OF INVENTION

One aspect of the present invention is an image processing device including: a color space conversion unit that calculates brightness signals and color difference signals from RGB signals of two images of a single subject acquired under different image acquisition conditions; a color difference determination unit that determines whether or not the absolute value of the difference between the color difference signals of the two images calculated by the color space conversion unit is smaller than a predetermined threshold value; and a color averaging unit that, if the color difference determination unit determines that the absolute value of the difference between the color difference signals of the two images is smaller than the threshold value, averages the color difference signals of the two images and calculates average color difference signals.

Furthermore, another aspect of the present invention is an image processing device including: a color space conversion unit that calculates luminance signals and chromaticity coordinate values from RGB signals of two images of a single subject acquired under different image acquisition conditions; a color difference determination unit that determines whether or not the absolute value of the difference between the chromaticity coordinate values of the two images calculated by the color space conversion unit is smaller than a predetermined threshold value; and a color averaging unit that, if the color difference determination unit determines that the absolute value of the difference between the chromaticity coordinate values of the two images is smaller than the threshold value, averages the chromaticity coordinate values of the two images and calculates average chromaticity coordinate values.

Furthermore, another aspect of the present invention is an image processing method including: a color space conversion step of calculating brightness signals and color difference signals from RGB signals of two images of a single subject acquired under different image acquisition conditions; a color difference determination step of determining whether or not the absolute value of the difference between the color difference signals of the two images calculated in the color space conversion step is smaller than a predetermined threshold value; and a color averaging step of averaging the color difference signals of the two images and calculating average color difference signals if it is determined in the color difference determination step that the absolute value of the difference between the color difference signal of the two images is smaller than the threshold value.

Furthermore, another aspect of the present invention is an image processing method including: a color space conversion step of calculating luminance signals and chromaticity coordinate values from RGB signals of two images of a single subject acquired under different image acquisition conditions; a color difference determination step of determining whether or not the absolute value of the difference between the chromaticity coordinate values of the two images calculated in the color space conversion step is smaller than a predetermined threshold value; and a color averaging step of averaging the chromaticity coordinate values of the two images and calculating average chromaticity coordinate values if it is determined in the color difference determination step that the absolute value of the difference between the chromaticity coordinate values of the two images is smaller than the threshold value.

DESCRIPTION OF EMBODIMENTS

An image processing device 1 according to one embodiment of the present invention will now be described with reference to the drawings.

Figure 1:
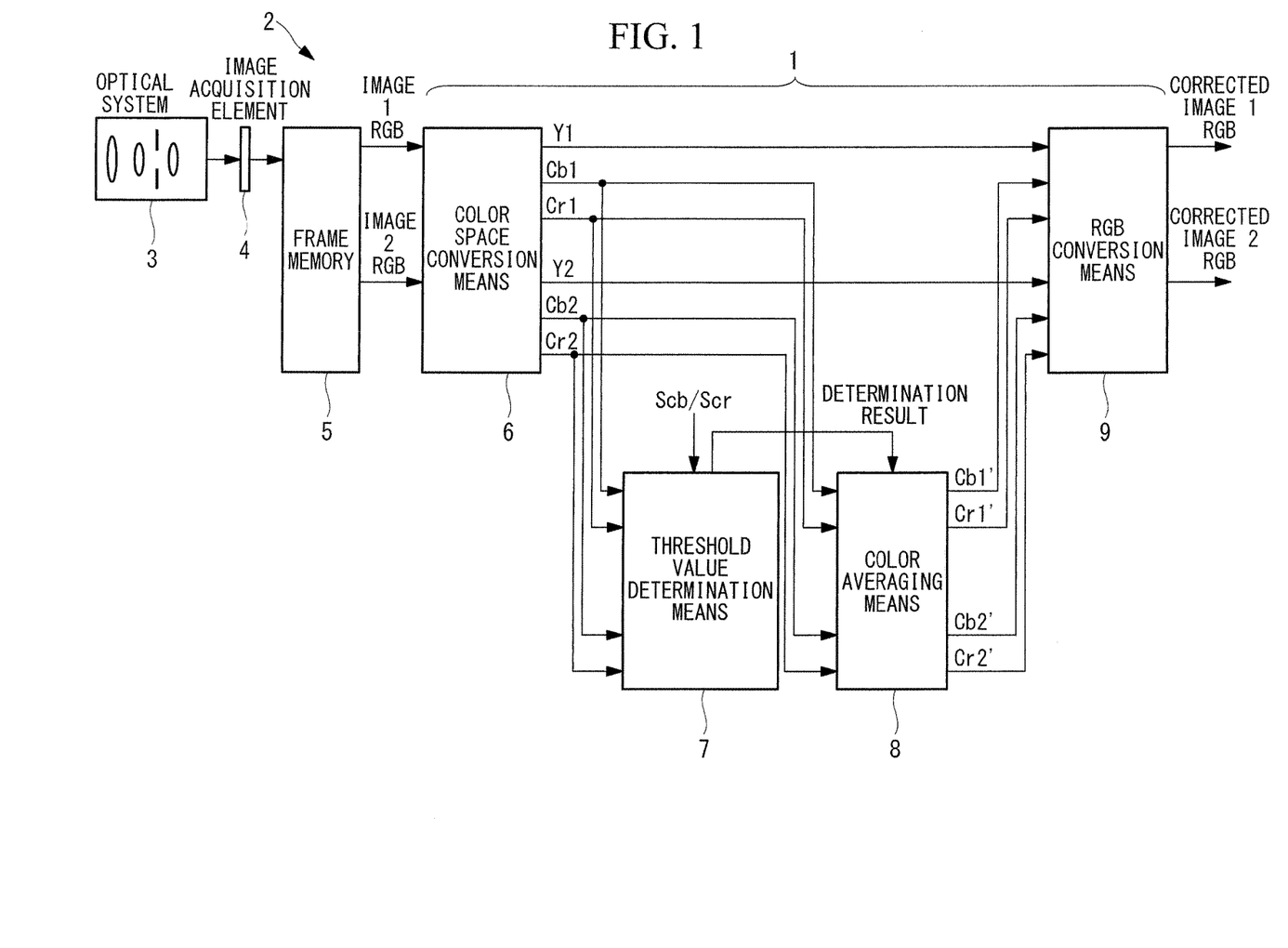
FIG. 1 is an overall configuration diagram showing an image processing device according to one embodiment of the present invention.

As shown in FIG. 1, the image processing device 1 according to this embodiment is provided in an image acquisition device 2.

The image acquisition device 2 includes: an optical system 3 for collecting light from a subject; an image acquisition element 4 for acquiring an image of the light collected by the optical system 3; a frame memory 5 for storing the image acquired by the image acquisition element 4; and the image processing device 1 according to this embodiment for processing the image stored in the frame memory 5.

The optical system 3 includes a beam splitter (not shown in the figure) for splitting off the light from the subject and focuses two images having different focal lengths at the image acquisition element 4. By doing so, the image acquisition element 4 is capable of simultaneously acquiring the RGB signals of two images.

The RGB signals of the acquired two images are temporarily stored in the frame memory 5 and are then input to the image processing device 1.

The image processing device 1 includes: color space conversion means (a color space conversion unit) 6 that converts the RGB signals of the two input images into YCbCr signals and that outputs brightness signals Y1 and Y2 and color difference signals Cb1, Cb2, Cr1, and Cr2; threshold value determination means (a color difference determination unit) 7 that calculates the difference Cb1−Cb2 between the color difference signals Cb1 and Cb2 and the difference Cr1−Cr2 between the color difference signals Cr1 and Cr2 of the two image and that compares the differences with predetermined threshold values Scb and Scr; color averaging means (a color averaging unit) 8 that switches a calculation method on the basis of the determination result in the threshold value determination means 7 and that calculates the average values Cb1', Cb2', Cr1', Cr2' of the color difference signals; and RGB conversion means (an RGB conversion unit) 9 for generating RGB signals of the images from the brightness signals Y1 and Y2 and the average values (average color difference signals) Cb1', Cb2', Cr1', and Cr2' of the color difference signals.

More specifically, the threshold value determination means 7 subtracts, from the color difference signals Cb1 and Cr1 generated by converting the RGB signals of one image, the color difference signals Cb2 and Cr2 generated by converting the RGB signals of the other image to calculate the differences Cb1−Cb2 and Cr1−Cr2, compares the differences Cb1−Cb2 and Cr1−Cr2 with the predetermined threshold values Scb and Scr, and then determines whether or not the following expressions are satisfied.

$$|Cb1-Cb2|<Scb \qquad (1)$$

$$|Cr1-Cr2|<Scr \qquad (2)$$

If conditional expression (1) is satisfied, the color averaging means 8 performs the following calculations.

$$Cb1'=\alpha Cb1+(1-\alpha)Cb2 \qquad (3)$$

$$Cb2'=\alpha Cb2+(1-\alpha)Cb1 \qquad (4)$$

If conditional expression (2) is satisfied, the color averaging means 8 performs the following calculations.

$$Cr1'=\beta Cr1+(1-\beta)Cr2 \qquad (5)$$

$$Cr2'=\beta Cr2+(1-\beta)Cr1 \qquad (6)$$

Here, $0 \leq \alpha < 1$ and $0 \leq \beta < 1$.

If conditional expression (1) is not satisfied, the color averaging means 8 performs the following calculations.

$$Cb1'=Cb1 \qquad (7)$$

$$Cb2'=Cb2 \qquad (8)$$

If conditional expression (2) is not satisfied, the color averaging means 8 performs the following calculations.

$$Cr1'=Cr1 \qquad (9)$$

$$Cr2'=Cr2 \qquad (10)$$

An image processing method using the image processing device 1 according to this embodiment with the above-described structure will be described below with reference to the drawings.

Figure 2:
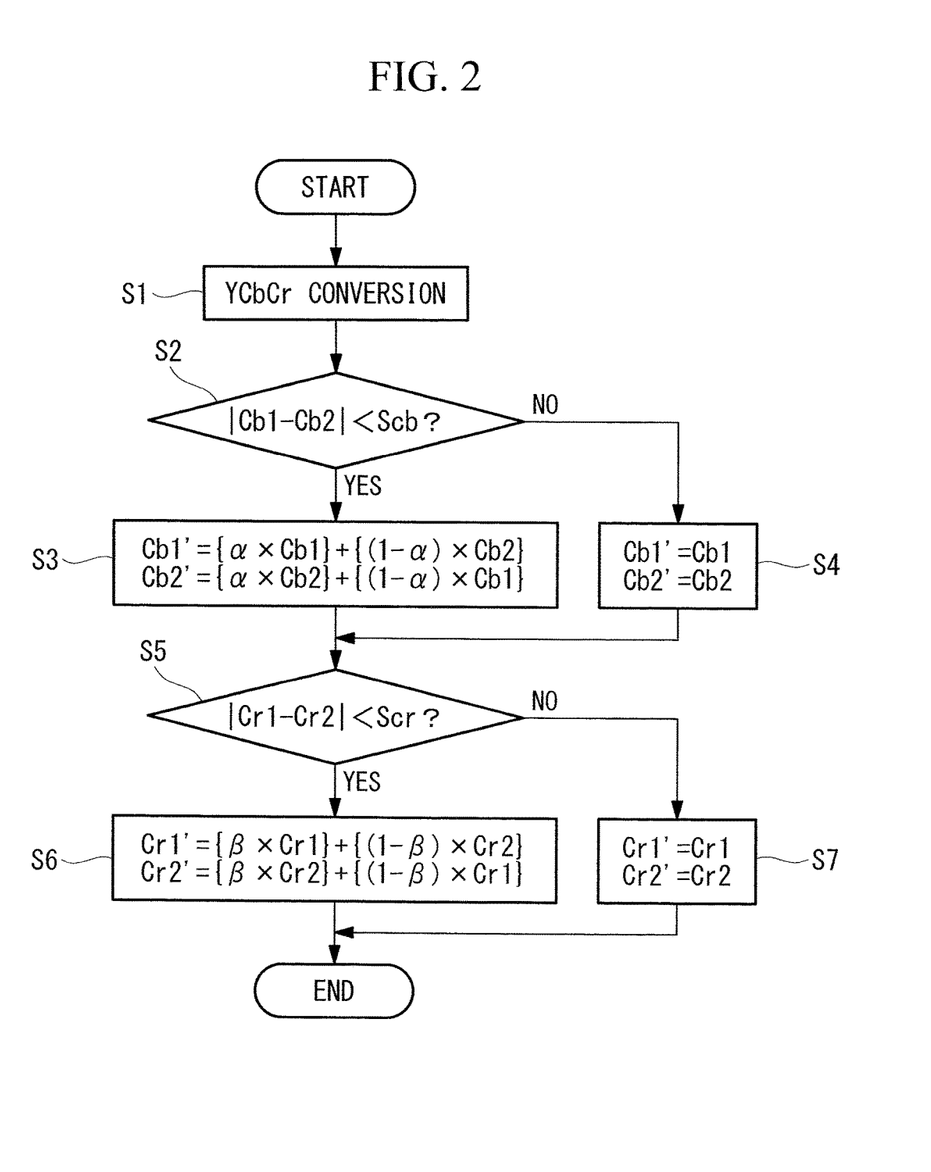
FIG. 2 is a flowchart illustrating an image processing method using the image processing device in FIG. 1.

When the RGB signals of two images of a single subject simultaneously acquired under different image acquisition conditions are input to the image processing device 1, the RGB signals at all pixel positions of the two images are converted into YCbCr signals in the color space conversion means, as shown in FIG. 2 (color space conversion step S1).

Thereafter, the difference Cb1-Cb2 between the color difference signals Cb1 and Cb2 of the two images is calculated in the threshold value determination means 7, and then it is determined whether or not the difference is smaller than the predetermined threshold value Scb, as shown in conditional expression (1) (color difference determination step S2). According to the determination result, the color averaging means 8 performs the calculations in expressions (3) and (4) if conditional expression (1) is satisfied (step S3) or performs the calculations in expressions (7) and (8) if conditional expression (1) is not satisfied (step S4), thus producing the average color difference signals Cb1' and Cb2'.

Next, the difference Cr1-Cr2 between the color difference signals Cr1 and Cr2 of the two images is calculated in the same manner, and then it is determined whether or not the difference is smaller than the predetermined threshold value Scr, as shown in conditional expression (2) (step S5). According to the determination result, the color averaging means 8 performs the calculations in expressions (5) and (6) if conditional expression (2) is satisfied (step S6) or performs the calculations in expressions (9) and (10) if conditional expression (2) is not satisfied (step S7), thus producing the average color difference signals Cr1' and Cr2'.

Figure 3A:
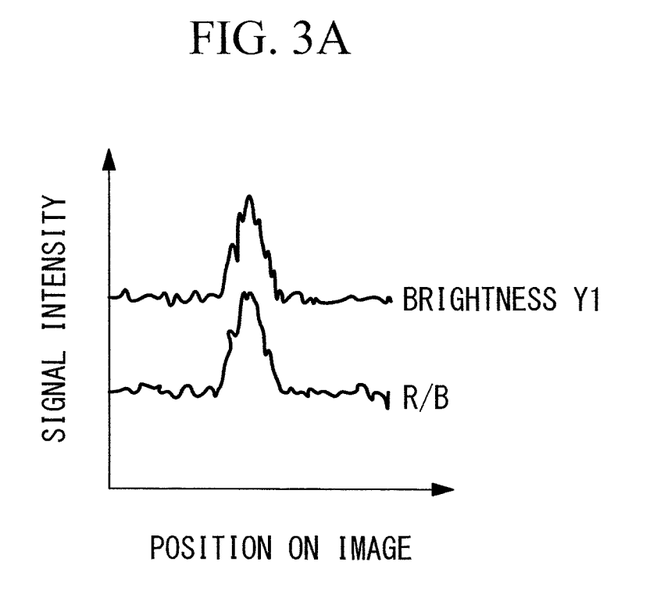
FIG. 3A is a diagram depicting a case in which the correlation between the brightness signal and the R/B signal in one of two images acquired using the image processing method in FIG. 2 is high.
Figure 3B:
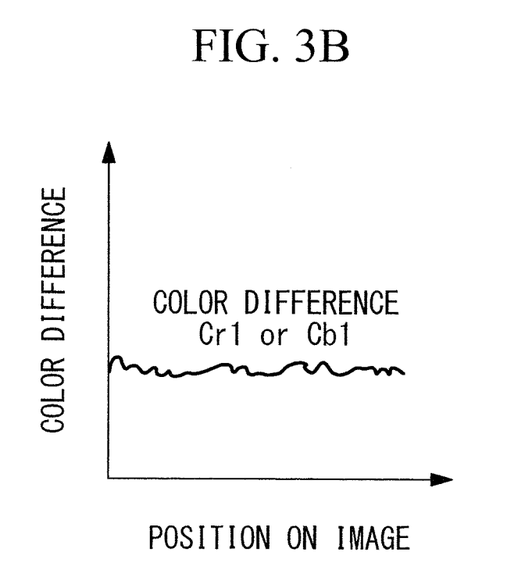
FIG. 3B is a diagram depicting a color difference signal equivalent to the difference between the brightness signal and the R/B signal in FIG. 3A.
Figure 3C:
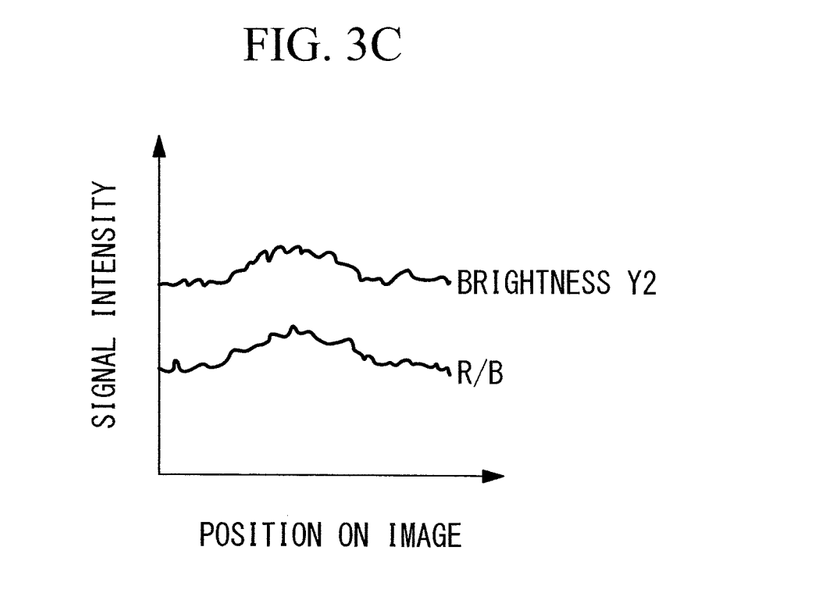
FIG. 3C is a diagram depicting a case in which the correlation between the brightness signal and the R/B signal in the other of the two images acquired using the image processing method in FIG. 2 is high.
Figure 3D:
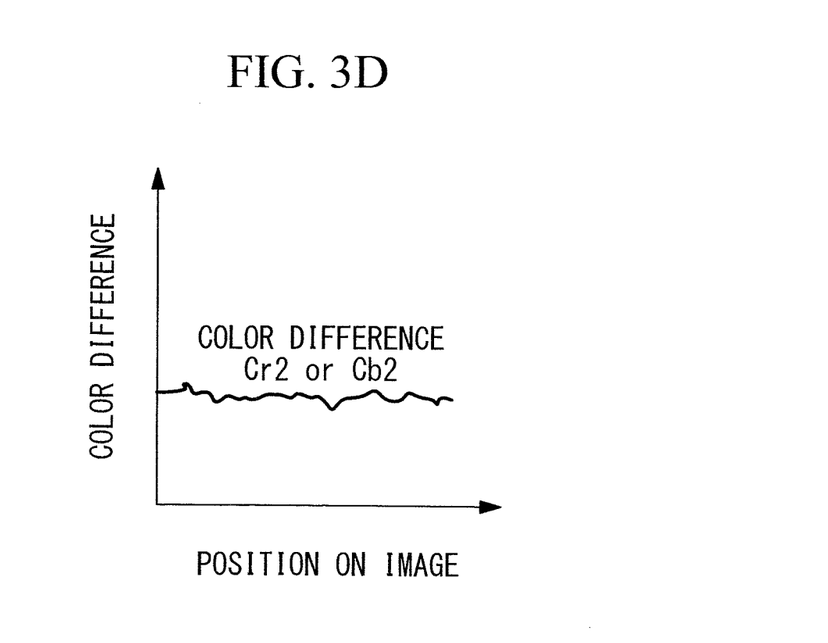
FIG. 3D is a diagram depicting a color difference signal equivalent to the difference between the brightness signal and the R/B signal in FIG. 3C.

FIGS. 3A and 3C show a more specific example of the brightness signals Y1 and Y2 and R/B signals (R signal or B signal) of the two images. In this example, the image in FIG. 3C is more blurred than the image in FIG. 3A. Because the correlations between the brightness signals Y1 and Y2 and the R/B signals are high in these images, the color difference signals Cb1, Cr1, Cb2, and Cr2, which are equivalent to the differences between these brightness signals Y1 and Y2 and the R/B signals, become substantially constant, as shown in FIGS. 3B and 3D.

Figure 3E:
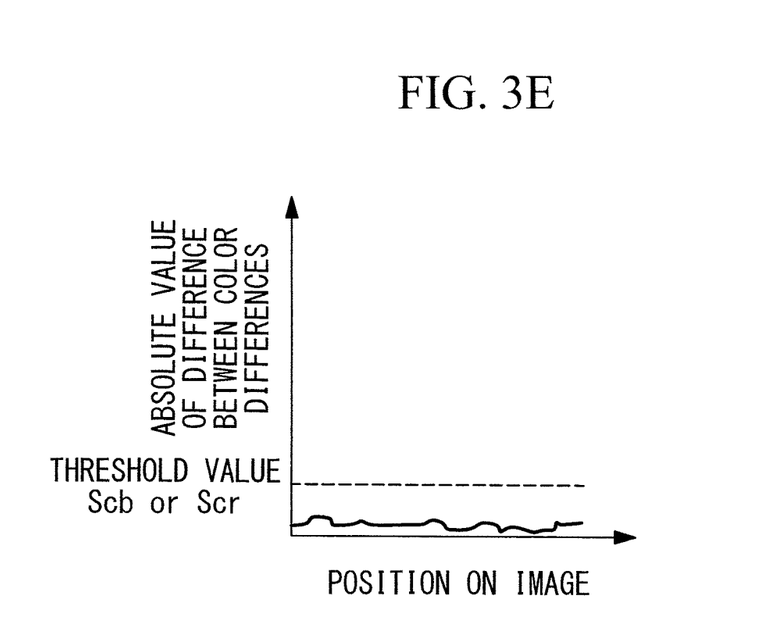
FIG. 3E is a diagram depicting a case in which the absolute value of the difference in color difference signal between the two images acquired using the image processing method in FIG. 2 is smaller than a predetermined threshold value.
Figure 3F:
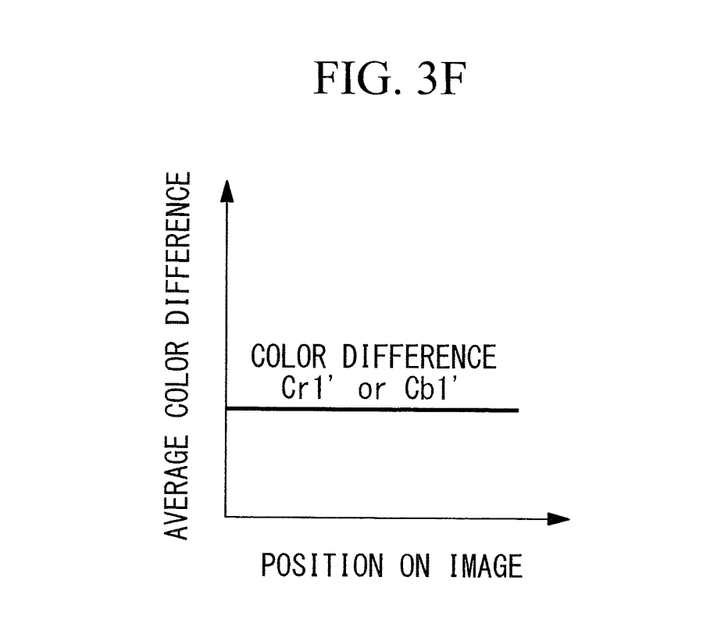
FIG. 3F is a diagram depicting an average color difference signal for the one image in FIG. 3E, as obtained by averaging the color difference signals.
Figure 3G:
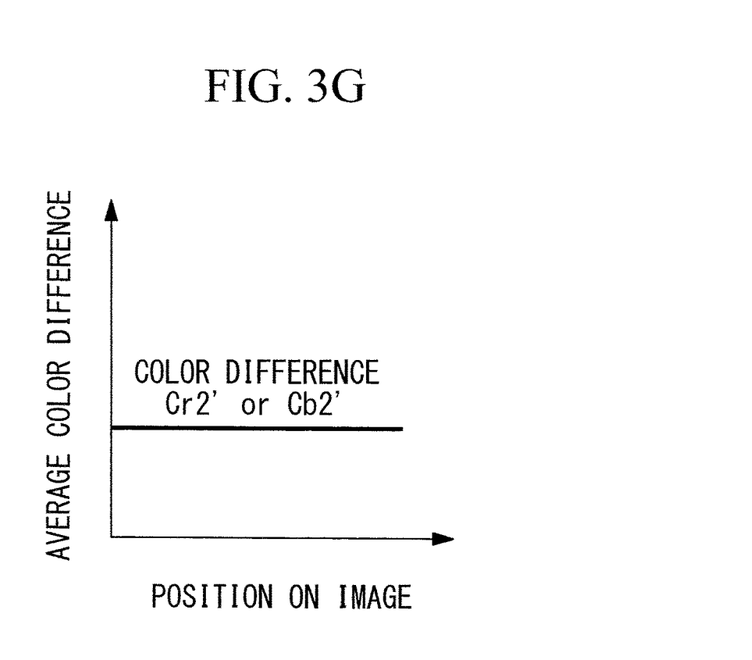
FIG. 3G is a diagram depicting an average color difference signal for the other image in FIG. 3E, as obtained by averaging the color difference signals.

Therefore, if the color difference signals Cb1 and Cb2 or the color difference signals Cr1 and Cr2 approximate each other between the two images, in other words, if the difference is smaller than the predetermined threshold values Scb or Scr as shown in FIG. 3E, then the average color difference signals Cb1', Cb2', Cr1', and Cr2', which have reduced color noise, can be acquired by calculating the averages between the respective two color difference signals, as shown in FIGS. 3F and 3G.

Figure 4A:
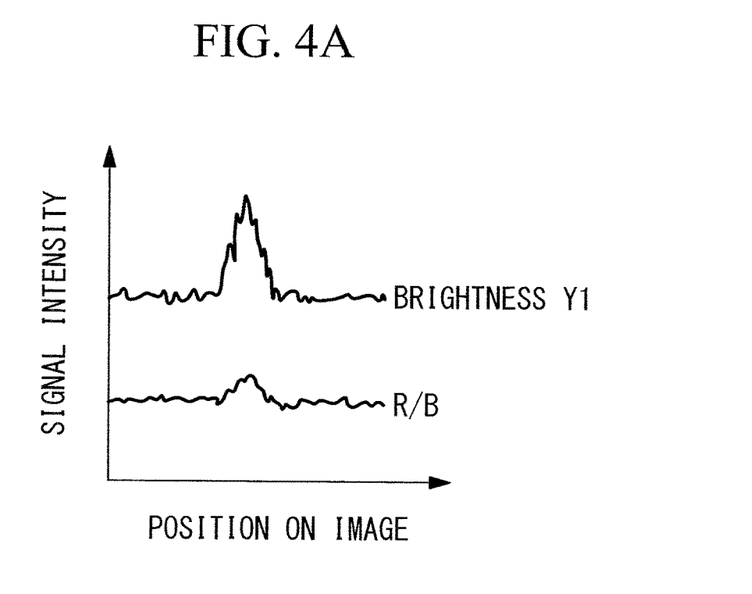
FIG. 4A is a diagram depicting a case in which the correlation between the brightness signal and the R/B signal in one of the two images acquired using the image processing method in FIG. 2 is low.
Figure 4B:
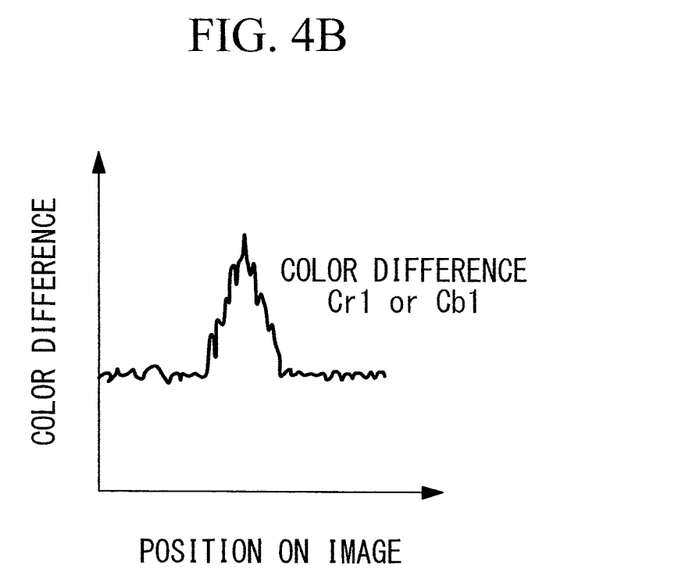
FIG. 4B is a diagram depicting a color difference signal equivalent to the difference between the brightness signal and the R/B signal in FIG. 4A.
Figure 4C:
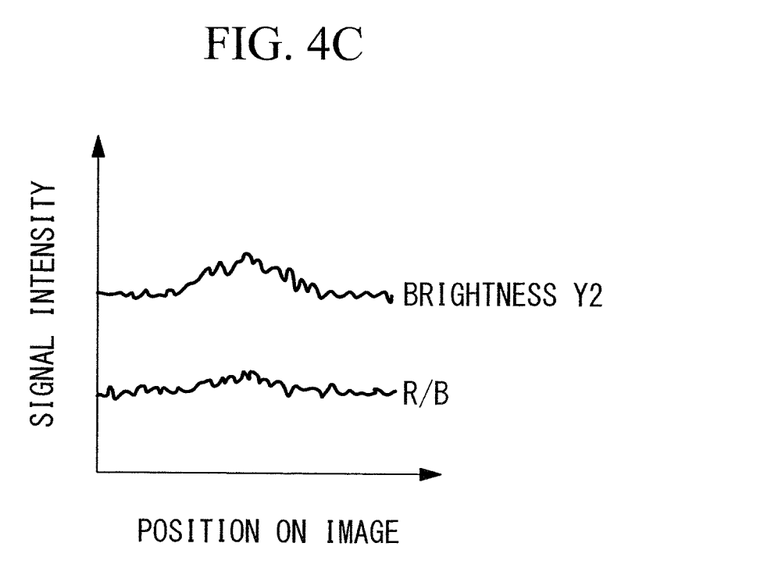
FIG. 4C is a diagram depicting a case in which the correlation between the brightness signal and the R/B signal in the other of the two images acquired using the image processing method in FIG. 2 is low.
Figure 4D:
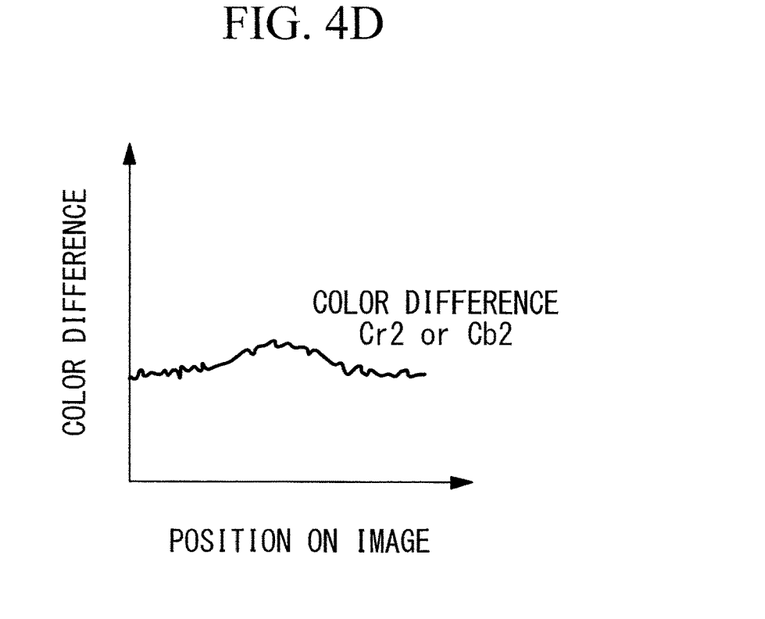
FIG. 4D is a diagram depicting a color difference signal equivalent to the difference between the brightness signal and the R/B signal in FIG. 4C.

On the other hand, if the correlations between the brightness signals Y1 and Y2 and the R/B signals are low, as shown in FIGS. 4A and 4C, then the color difference signals Cb1, Cb2, Cr1, and Cr2 vary as shown in FIGS. 4B and 4D.

Figure 4E:
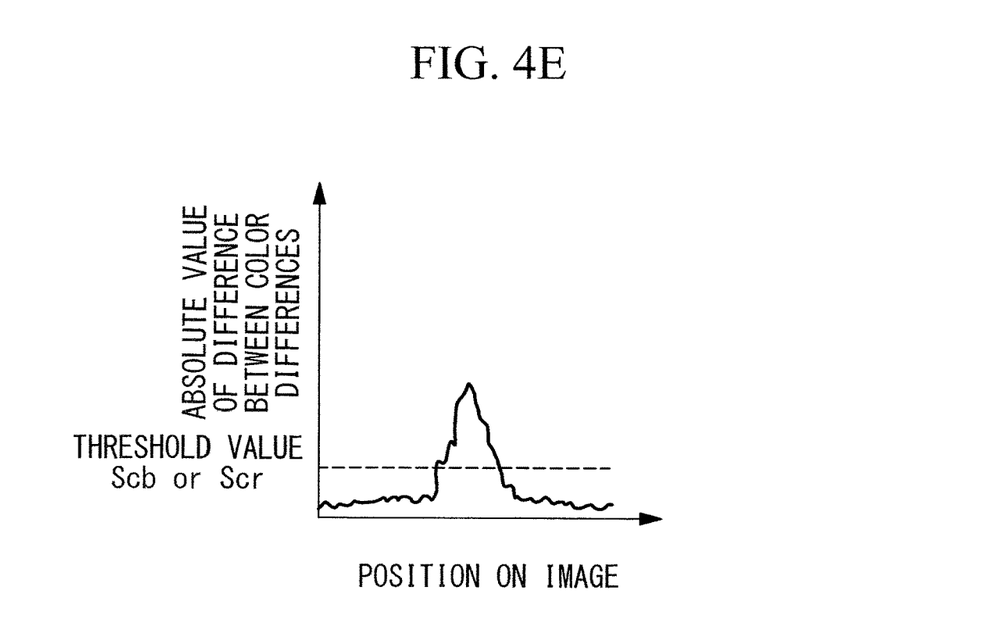
FIG. 4E is a diagram depicting a case in which there exists a region in which the absolute value of the difference in color difference signal between the two images acquired using the image processing method in FIG. 2 exceeds a predetermined threshold value.
Figure 4F:
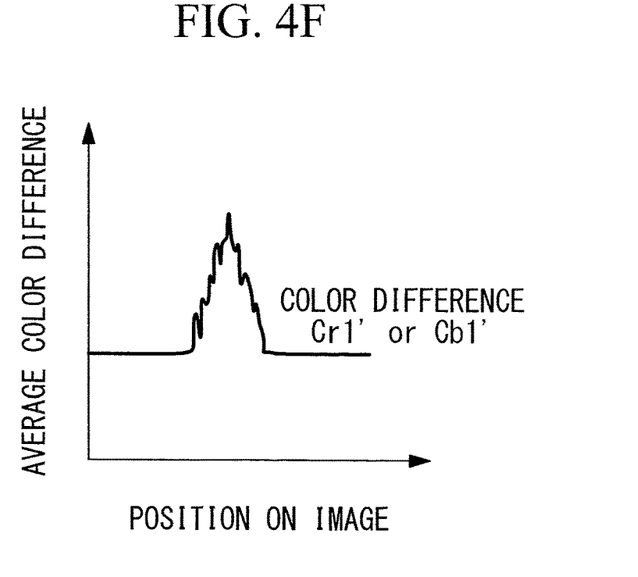
FIG. 4F is a diagram depicting an average color difference signal for the one image, as obtained by averaging color difference signals in a region in which the difference between the color difference signals does not exceed the threshold value in FIG. 4E.
Figure 4G:
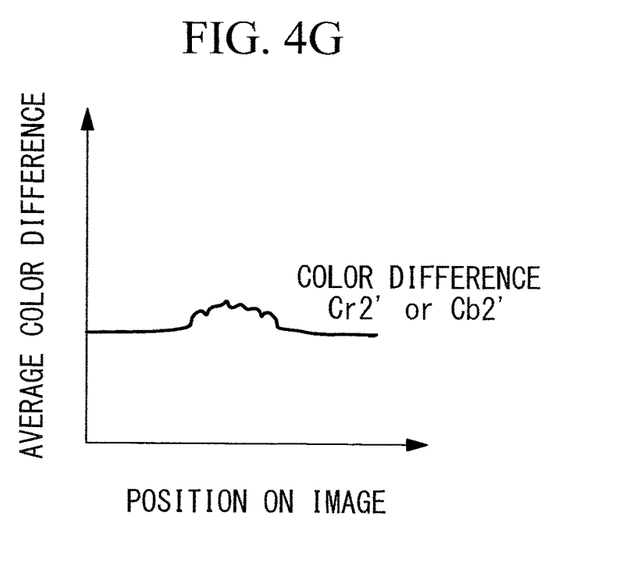
FIG. 4G is a diagram depicting an average color difference signal for the other image, as obtained by averaging color difference signals in a region in which the difference between the color difference signals does not exceed the threshold value in FIG. 4E.

In a region in which the color difference signals Cb1, Cb2, Cr1, and Cr2 approximate each other between the two image, color noise can be reduced in the same manner as described above, and furthermore if there is a region in which the color difference signals Cb1, Cb2, Cr1, and Cr2 differ greatly, in other words, if there is a region in which the differences exceed the predetermined threshold values Scb and Scr as shown in FIG. 4E, then the averages between the respective two color difference signals can be calculated only in a region in which the differences do not exceed the threshold values Scb and Scr, as shown in FIGS. 4F and 4G, thereby making it possible to acquire, in that region, the average color difference signals Cb1', Cb2', Cr1', and Cr2' with reduced color noise. By doing so, it is possible to prevent averaging also being performed in a region in which the correlations between the brightness signals Y1 and Y2 and the R/B signals are low.

As described above, the image processing device 1 and image processing method according to this embodiment afford an advantage in that, even if a difference in blurring level takes place between two images of a single subject acquired under different image acquisition conditions, averaging is performed only in a region having a high correlation in color difference signal between the two images, thereby making it possible to reduce color noise while maintaining the contrast in that region. In other words, when this embodiment is applied to two images having different focal lengths, images with suppressed color noise and a high depth of field can be acquired.

In this embodiment, the color space conversion means 6 converts the RGB signals of images into the YCbCr signals and averages the color difference signals of the two images, provided that the absolute values of the differences in the color difference signals between the two images are smaller than the predetermined threshold values.

Instead of this, the RGB signals of the images may be converted into the YUV signals and YPbPr signals.

Furthermore, the RGB color space of images may be converted into the L*a*b* color space or L*u*v* color space.

In this case, it is advisable that the L* signal, representing the luminance level, be used instead of the brightness signal Y in the above-described embodiment and that the a* signal and b* signal or the u* signal and v* signal, representing chromaticity coordinate values, be used instead of the color difference signals Cb and Cr.

Furthermore, this embodiment has been described by way of an example of two images of a single subject acquired with different focal lengths. Instead of this, the embodiment may be applied to a case where two images of a single subject acquired with different parallax are processed.

The above-described embodiment leads to the following invention.

One aspect of the present invention is an image processing device including: a color space conversion unit that calculates brightness signals and color difference signals from RGB signals of two images of a single subject acquired under different image acquisition conditions; a color difference determination unit that determines whether or not the absolute value of the difference between the color difference signals of the two images calculated by the color space conversion unit is smaller than a predetermined threshold value; and a color averaging unit that, if the color difference determination unit determines that the absolute value of the difference between the color difference signals of the two images is smaller than the threshold value, averages the color difference signals of the two images and calculates average color difference signals.

According to this aspect, when the RGB signals of two images of the single subject acquired under different image acquisition conditions are input, the brightness signals and the color difference signals are calculated in the color space conversion unit, and it is determined in the color difference determination unit whether or not the absolute value of the difference between the color difference signals of the two images is smaller than the predetermined threshold value. If it is determined that the absolute value of the difference is smaller than the predetermined threshold value, then the color difference signals of the two images are averaged in the color averaging unit, thereby calculating the average color difference signals.

The inventors have found that, if the correlation between the R signal or the B signal of the RGB signals and the brightness signal in images is high, the intensities of the color difference signals do not differ despite a change in blurring level between two images. In short, under such conditions, smoothing color difference signals between the images is expected to provide a high noise reduction effect while still maintaining the contrast. More specifically, averaging and smoothing the color difference signals between the two images can enhance the noise reduction effect while still maintaining the contrast, in a case where the difference in color difference signal between the two images is smaller than a predetermined threshold value, which indicates that the correlation between the R signal or the B signal and the brightness signal is high.

The above-described aspect may include an RGB conversion unit that calculates RGB signals from the average color difference signals calculated by the color averaging unit and the brightness signals calculated by the color space conversion unit.

By doing so, images with reduced noise can be generated.

Furthermore, in the above-described aspect, the color space conversion unit may calculate, from the RGB signals of the two images, Cb signals and Cr signals as the color difference signals.

Furthermore, another aspect of the present invention is an image processing device including: a color space conversion unit that calculates luminance signals and chromaticity coordinate values from RGB signals of two images of a single subject acquired under different image acquisition conditions; a color difference determination unit that determines whether or not the absolute value of the difference between the chromaticity coordinate values of the two images calculated by the color space conversion unit is smaller than a predetermined threshold value; and a color averaging unit that, if the color difference determination unit determines that the absolute value of the difference between the chromaticity coordinate values of the two images is smaller than the threshold value, averages the chromaticity coordinate values of the two images and calculates average chromaticity coordinate values.

According to this aspect, when the RGB signals of two images of the single subject acquired under different image acquisition conditions are input, the luminance signal and chromaticity coordinate values are calculated in the color space conversion unit, and it is determined in the color difference determination unit whether or not the absolute value of the difference between the chromaticity coordinate values of the two images is smaller than the predetermined threshold value. If it is determined that the absolute value of the difference is smaller than the predetermined threshold value, then the chromaticity coordinate values of the two images are averaged in the color averaging unit, thereby calculating the average chromaticity coordinate values.

If the correlation between the R signal or the B signal of the RGB signals and the luminance signal in images is high, the chromaticity coordinate values do not differ despite a change in blurring level between two images, and hence, under such conditions, smoothing the chromaticity coordinate values between the images is expected to provide a high noise reduction effect while still maintaining the contrast. More specifically, averaging and smoothing the chromaticity coordinate values between the two images can enhance the noise reduction effect while still maintaining the contrast, in a case where the difference in chromaticity coordinate value between the two images is smaller than a predetermined threshold value, which indicates that the correlation between the R signal or the B signal and the luminance signal is high.

The above-described aspect may include an RGB conversion unit that calculates RGB signals from the average chromaticity coordinate values calculated by the color averaging unit and the luminance signals calculated by the color space conversion unit.

By doing so, images with reduced noise can be generated.

Furthermore, in the above-described aspect, the color space conversion unit may calculate, from the RGB signals of the two images, *a signals and *b signals as the chromaticity coordinate values.

Furthermore, in the above-described aspect, the two images may have different focal lengths.

Furthermore, in the above-described aspect, the two images may have different parallaxes.

Furthermore, another aspect of the present invention is an image processing method including: a color space conversion step of calculating brightness signals and color difference signals from RGB signals of two images of a single subject acquired under different image acquisition conditions; a color difference determination step of determining whether or not the absolute value of the difference between the color difference signals of the two images calculated in the color space conversion step is smaller than a predetermined threshold value; and a color averaging step of averaging the color difference signals of the two images and calculating average color difference signals if it is determined in the color difference determination step that the absolute value of the difference between the color difference signal of the two images is smaller than the threshold value.

Furthermore, another aspect of the present invention is an image processing method including: a color space conversion step of calculating luminance signals and chromaticity coordinate values from RGB signals of two images of a single subject acquired under different image acquisition conditions; a color difference determination step of determining whether or not the absolute value of the difference between the chromaticity coordinate values of the two images calculated in the color space conversion step is smaller than a predetermined threshold value; and a color averaging step of averaging the chromaticity coordinate values of the two images and calculating average chromaticity coordinate values if it is determined in the color difference determination step that the absolute value of the difference between the chromaticity coordinate values of the two images is smaller than the threshold value.

REFERENCE SIGNS LIST

1 Image processing device
6 Color space conversion means (color space conversion unit)
7 Threshold value determination means (color difference determination unit)
8 Color averaging means (color averaging unit)
9 RGB conversion means (RGB conversion unit)
S1 Color space conversion step
S2 Color difference determination step
S5 Color averaging step

The invention claimed is:

1. An image processing device comprising:
 a color space conversion unit that calculates brightness signals and color difference signals from RGB signals of two images of a single subject acquired under different image acquisition conditions;
 a color difference determination unit that determines whether or not an absolute value of the difference between the color difference signals of the two images calculated by the color space conversion unit is smaller than a predetermined threshold value; and
 a color averaging unit that, if the color difference determination unit determines that the absolute value of the difference between the color difference signals of the two images is smaller than the threshold value, averages the color difference signals of the two images and calculates average color difference signals.

2. The image processing device according to claim 1, comprising: an RGB conversion unit that calculates RGB signals from the average color difference signals calculated by the color averaging unit and the brightness signals calculated by the color space conversion unit.

3. The image processing device according to claim 1, wherein the color space conversion unit calculates, from the RGB signals of the two images, Cb signals and Cr signals as the color difference signals.

4. An image processing device comprising:
a color space conversion unit that calculates luminance signals and chromaticity coordinate values from RGB signals of two images of a single subject acquired under different image acquisition conditions;
a color difference determination unit that determines whether or not an absolute value of the difference between the chromaticity coordinate values of the two images calculated by the color space conversion unit is smaller than a predetermined threshold value; and
a color averaging unit that, if the color difference determination unit determines that the absolute value of the difference between the chromaticity coordinate values of the two images is smaller than the threshold value, averages the chromaticity coordinate values of the two images and calculates average chromaticity coordinate values.

5. The image processing device according to claim 4, comprising: an RGB conversion unit that calculates RGB signals from the average chromaticity coordinate values calculated by the color averaging unit and the luminance signals calculated by the color space conversion unit.

6. The image processing device according to claim 4, wherein the color space conversion unit calculates, from the RGB signals of the two images, *a signals and *b signals as the chromaticity coordinate values.

7. The image processing device according to claim 1, wherein the two images have different focal lengths.

8. The image processing device according to claim 1, wherein the two images have different parallaxes.

9. An image processing method comprising:
a color space conversion step of calculating brightness signals and color difference signals from RGB signals of two images of a single subject acquired under different image acquisition conditions;
a color difference determination step of determining whether or not an absolute value of the difference between the color difference signals of the two images calculated in the color space conversion step is smaller than a predetermined threshold value; and
a color averaging step of averaging the color difference signals of the two images and calculating average color difference signals if it is determined in the color difference determination step that the absolute value of the difference between the color difference signal of the two images is smaller than the threshold value.

10. An image processing method comprising:
a color space conversion step of calculating luminance signals and chromaticity coordinate values from RGB signals of two images of a single subject acquired under different image acquisition conditions;
a color difference determination step of determining whether or not an absolute value of the difference between the chromaticity coordinate values of the two images calculated in the color space conversion step is smaller than a predetermined threshold value; and
a color averaging step of averaging the chromaticity coordinate values of the two images and calculating average chromaticity coordinate values if it is determined in the color difference determination step that the absolute value of the difference between the chromaticity coordinate values of the two images is smaller than the threshold value.

* * * * *